United States Patent Office 3,033,838
Patented May 8, 1962

3,033,838
MODIFIED HALOGENATED POLYMERIC MATERIALS
Richard Louia Ray, Baton Rouge, La., assignor to Esso Research and Engineering Company, a corporation of Delaware
No Drawing. Filed June 29, 1959, Ser. No. 823,321
13 Claims. (Cl. 260—85.3)

This invention relates to modified rubbery polymeric halogenated compositions and, more particularly, to the preparation and vulcanization of compositions comprising a halogenated rubber polymer or copolymer which has been modified by reaction with the product of an alkali metal amide and an alkali metal $C_1$ to $C_8$ carboxylate.

By the present invention rubbery materials of increased molecular weight, better chemical resistance, enhanced ozone resistance, and higher ultraviolet resistance are obtained than were obtainable heretofore. The compositions of the present invention, which will be described more fully hereinafter, may be cured not only with sulfur or sulfur bearing compounds, zinc oxide or polyamines, but with a variety of materials such as epoxy resins and/or diisocyanates.

In accordance with the present invention, it has now been found that halogenated and particularly chlorinated rubbery polymers or copolymers of increased molecular weight and of better chemical and ozone reistance are obtained by reacting the same prior to curing with the reaction product of an alkali metal amide and alkali metal $C_1$ to $C_8$ carboxylate, preferably sodium amide which has been fused with sodium acetate.

The halogenated polymers and copolymers of the present invention, which will be more fully described hereinafter, may have Staudinger molecular weights of between 5,000 or 10,000 and 800,000 or higher and preferably between 40,000 and 500,000, it having been found that the lower molecular weight halogenated polymers and copolymers are extremely useful for plasticizers for such materials as polyvinyl chloride, polystyrene, etc.

Although the present invention is applicable generally to products comprising rubbery halogenated polymers and/or copolymers having mole percent unsaturations of below about 15, as more fully described hereinafter, it is particularly applicable to chlorinated and/or brominated butyl rubber, as well as chlorinated and/or brominated polyethylene and chlorinated and/or brominated ethylene-propylene copolymers, particularly those made in the presence of aluminum alkyl group IV metal halides as catalysts such as polyalkyl aluminum-titanium tri or tetra halides and especially such materials as triethyl aluminum-titanium trichloride or the like.

Halogenated butyl-type rubbery copolymers, which are vulcanizable solely with zinc oxide, polyamines, quinone dioximes or sulfur are produced by halogenating the butyl rubber in a manner which does not appreciably degrade the molecular weight thereof, but with sufficient halogen to produce a rubbery product which, when vulcanized, retains its tensile strength upon heat aging. Such halogenated butyl rubbers are also readily covulcanizable with more highly unsaturated rubbers, for example, by means of added sulfur or sulfur bearing compounds to produce rubbery products of excellent heat ageing resistance, since halogenated butyl rubbers do not greatly differ in curing rate as compared to natural rubber and synthetic rubbers such as GR–S rubber. Such covulcanizations may optionally also be in the presence of basic metal axides such as zinc oxide and/or accelerators of the type of thiuram sulfides and/or thiocarbamates.

Butyl rubber itself is a copolymer containing about 85 to 99.5% (preferably about 95 to 99.5%) of a $C_4$ to $C_7$ or $C_8$ isoolefin such as 2-methyl-1-butene, 3-methyl-1-pentene or especially isobutylene with about 15 to 0.5% (preferably 5 to 0.5 weight percent) of a multiolefin of about 4 to 14, preferably about 4 to 6 carbon atoms. Copolymers such as those above-mentioned, have Staudinger molecular weights of between about 20,000 and 300,000, are commonly referred to in patents and in literature as "butyl rubber" or GR–I rubber (Government Rubber-Isobutylene) and, for example, are referred to as "butyl rubber" in textbook "Synthetic Rubber" by G. S. Whitby. The preparation of butyl-type rubbers is also described in U.S. Patent 2,356,128 to Thomas et al. In general, the multiolefinic component of the rubber comprises such multiolefins as myrcene, allocimene, dimethallyl or preferably a conjugated diolefin such as isoprene, butadiene, dimethyl butadiene, piperylene, etc. The reaction product of isobutylene and isoprene is preferred. Butyl rubber preferably has a mole percent unsaturation of between about 0.5 to 10.0 or 15.0

In producing halogenated butyl rubber to be modified and vulcanized in accordance with the present invention, unmodified, unvulcanized butyl rubber is carefully halogenated so as to contain at least about 0.5 weight percent (preferably at least about 1.0 weight percent) combined halogen but not more than about "X" weight percent combined fluorine or chlorine or 3 "X" weight percent combined bromie or iodine wherein:

$$X = \frac{M_3 L}{(100-L)M_1 + L(M_2+M_3)} \times 100$$

and:

L = mole percent of the multiolefin in the polymer
$M_1$ = molecular weight of the isoolefin
$M_2$ = molecular weight of the multiolefin
$M_3$ = atomic weight of halogen Restated, there should be at least about 0.5 weight percent of combined halogen in the polymer but not more than about one atom of fluorine or chlorine or three atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, iodine monochloride, hydrogen fluoride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), N-bromo-succinimide, N-chloroacetanilide, tri-bromophenol bromide, N-chloroacetamide, N,N'-dimethyl-5,5 dichloro or di-bromo hydrantoin, and other common halogenating agents.

The halogenation is generally conducted at about —50° to about +300° C., advantageously at above about 0° to about 65° C., preferably at about 10° or 20° to 50° C. (room temperature generally being satisfactory), depending upon the particular halogenation agent, for about one minute to several (e.g., 3) hours. An advantageous pressure range is from about 0.5 to 400 p.s.i.a.; atmospheric pressure generally being satisfactory since the pressure is not critical. The halogenation conditions are regulated to halogenate the rubbery copolymer to the extent above-mentioned.

The halogenation may be accomplished in various ways. One process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in an inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 50% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The halogenated polymer may be precipitated with acetone or any other known non-solvent for the halogenated butyl rubber and dried under about 1 to 760 millimeters or higher of mercury pressure absolute at about 0° to 180° C., preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 2,500,000 and a mole percent unsaturation of between about 0.5 to 15.0, preferably about 0.6 to 5.0 or 8.0.

Another halogenated polymer, useful for the purposes of the present invention, comprises a homopolymer of an aliphatic olefin (e.g., ethylene) which is halogenated and at least partially dehalogenated to produce a low unsaturation vulcanizable product. The process may be conducted by reacting the polymer, at a temperature above its melting point, with a halogenating agent under such conditions that halogenation and partial dehalogenation occur substantially simultaneously. This result is effected by conducting the reaction between the polymer and the halogenating agent at a temperature in the range of about 150° C. to 300° C., preferably about 175° C. to 275° C.

The halogenation reaction may optionally be conducted in the presence of a dehydrohalogenation catalyst such as metallic magnesium, metallic zinc, magnesium chloride, zinc chloride or barium chloride etc. Also, the reaction may be optionally conducted in the presence of a halogenation catalyst of a type well known in the art, or the reactants may be irradiated as, for example, with sunlight or ultraviolet light. The halogenated homopolymer produced is vulcanizable with sulfur and has an iodine number of about 0.1 to 200, preferably 0.5 to 100, the viscosity average molecular weight being about 100,000 to 2,000,000. As the halogenating agent, an elemental halogen of the group fluorine, chlorine, bromine, or iodine or especially chlorine, bromine or iodine or a compound which yields these elements under the reaction conditions may be used.

Still other types of halogenated polymers, useful for the purposes of the present invention, comprise low pressure halogenated copolymers of mixtures of alpha olefins such as ethylene and a higher alpha olefin such as propylene or the like.

Certain low pressure polymerizations of mixtures of alpha olefins with catalyst systems made up of reducible heavy transition metal compounds and a reducing metal containing compound are well known in the art; e.g., Belgian Patent 533,362 "Chemical and Engineering News," April 8, 1957, pages 12 through 16, and "Petroleum Refiner," December 1956, pages 191 through 196. Also, the preparation of rubbery copolymers of ethylene and higher alpha olefins by the low pressure polymerization process is described in copending application Ser. No. 672,435, filed July 17, 1957. When such copolymers are halogenated as just mentioned, they exhibit iodine numbers of about 0.5 to 100.

Halogenated rubbery copolymers of ethylene and higher alpha olefins such as propylene, which are suitable, when cured as synthetic rubbers, may also be prepared by first copolymerizing ethylene and a higher alpha olefin in contact with a low pressure polymerization catalyst in an inert diluent, preferably inactivating or removing the polymerization catalyst, treating the polymerization mixture with a halogenating agent and isolating the resulting halogenated copolymer. This is the preferred procedure of producing halogenated rubbery copolymers of say ethylene and propylene.

Such low pressure polymerization catalysts, particularly useful, are preferably in the nature of preformed catalytic materials. These catalysts are generally activated partially reduced heavy transition metal compounds or activated partially reduced heavy transition metal compounds cocrystallized with a group II or III metal compound such as halides, e.g., aluminum chloride, boron trichloride, zinc chloride, and the like.

The partially reduced heavy transition metal compounds include, among others, inorganic compounds such as the halides, oxy-halides, complex halides, oxides and hydroxides, and organic compounds such as alcoholates, acetates, benzoates, and acetonates of the transition metals of the IV, V, VI, VII and VIII groups of the periodic system as well as iron and copper, e.g., titanium, zirconium, hafnium, thorium, uranium, vanadium, niobium, tantalum, chromium, molybdenum, tungsten and manganese, etc. The metal halides, particularly the chlorides, are generally preferred; especially purple crystalline titanium trichloride. Purple crystalline titanium trichloride cocrystallized with aluminum chloride is particularly preferred.

When the catalyst is a partially reduced heavy transition metal compound cocrystallized with a group II or III metal compound, the catalyst contains from about 0.02 or 0.05 to 1.0 to 2.0 preferably 0.1 to 0.5 moles of the group II or III metal compound per mole of partially reduced heavy transition metal compound.

The partially reduced heavy transition metal compounds may be prepared by various procedures. Some of the methods useful for preparing such preformed catalysts (e.g., purple crystalline titanium trichloride cocrystallized with aluminum chloride) are summarized below:

(1) Reduction of titanium tetrachloride with aluminum powder in xylene at 100–175° C. at atmospheric pressure.

(2) Metal reduction of titanium tetrachloride with either aluminum powder, titanium powder, or mixtures of aluminum and titanium powders in the absence of solvents at elevated temperatures.

(3) Hydrogen reduction of titanium tetrachloride at temperatures above about 650° C.

(4) Reduction of titanium tetrachloride with metal alkyls, AlEt$_3$ in particular, in an inert diluent above about 150° C.

(5) Heating a mixture of titanium tetrachloride and an aluminum alkyl after the formation of a brown precipitate at a temperature above about 70° C. in the presence of an inert diluent.

(6) Reducing titanium tetrachloride with an aluminum trialkyl by carrying out the reduction in temperature graded stages in an inert diluent and with an aluminum trialkyl/TiCl$_4$ mole ratio of about 0.3/1.

(7) Heat reduction of titanium tetrachloride at temperatures above about 1000° C.

These catalysts are then advantageously activated with organo-metallic compounds, preferably organo-aluminum compounds, and especially aluminum alkyl compounds, such as alkyl aluminum halides and trialkyl aluminum, e.g., triethyl aluminum. Other organo-metallic compounds that may be used include dialkyl zinc, dialkyl magnesium, triaryl aluminum and complexes such as lithium aluminum trialkyl. In general, from about 0.05 or 0.1 to 5.0 or 10.0 moles of the activating organometallic compound per mole of partially reduced transition metal halide is added to the catalyst in an inert diluent.

The inert diluents preferably employed are aliphatic and aromatic hydrocarbons. Halogenated aromatic hydrocarbons may also be used. Examples of useful diluents are n-hexane, n-heptane, n-decane, benzene, chlorobenzene, dichlorobenzenes, and the like. The aromatic hydrocarbons are the preferred diluents for use with the preformed catalysts, which are the preferred catalysts.

The copolymerization of ethylene and a higher alpha olefin such as propylene is generally carried out in an inert aromatic diluent, such as mentioned above, with from 10 or 15 to 85 or 90 mol. percent, preferably 40 to 60 mol. percent of ethylene and with 85 or 90 to 10 or 15 mol. percent preferably 60 to 40 mol. percent of the alpha olefin (preferably propylene) containing from 3 to 6 carbon atoms at pressures ranging from atmospheric to 15 or 20 atmospheres with a catalyst concentration of 0.05 or 0.1 to 5 or 10 g./l., preferably 0.5 to 2.0 g./l. The polymerization temperature is not critical although temperatures in the range of 0° to 120° C., preferably about 30° to 80° C., are generally used. The polymerization is permitted to proceed until the concentration of copolymer in the inert diluent is from about 50 to 200 g./l.

The polymerization reaction mixture may then be utilized for the halogenating step with or without isolating the copolymer contained therein. Unreacted olefins may be purged prior to halogenation (e.g., chlorination) by passing an inert gas such as nitrogen through the reaction mixture. It is then highly preferred that the catalyst be inactivated or physically removed as by washing with water. Although the halogenation step may, if desired, be carried out without inactivating or removing the catalyst, in general low halogenation reaction rates result. The catalyst inactivator, when used, may be a compound containing an OH group, such as steam, water and lower aliphatic alcohols having from 1 to 5 carbon atoms per molecule, preferably methanol, or a chelating agent, such as ketones and 2,3- and 2,4-diketones. Water and steam are preferred. A mixture of any of the above catalyst inactivators may also be used.

The halogenation reaction is carried out by treating the copolymerization reaction mixture with a halogenating agent such as chlorine, bromine, iodine, fluorine, dichloro dimethylhydantoin, N-bromosuccinimide, and the like, chlorine being preferred. Halogenation conditions may be varied widely and are not critical. An advantageous temperature range is from about −50° C. to +150° C. depending on the activity of the halogenating agent employed. When chlorine is used as the halogenating agent, preferred temperatures are from about 10° to 120° C., especially about 20° to 100° C., the reaction time generally varying from about one minute to about one hour. Pressures of from slightly below atmospheric to about 250 atmospheres are employed.

In general, the quantity of halogenating agent is chosen to produce about 1 to 15 times the amount of halogen that reacts with the copolymer, the latter amount being sufficient to provide halogenated copolymers having from about 0.1 to 50 weight percent, preferably 1 to 20 weight percent combined halogen.

The halogenated rubbery copolymers formed are of relatively low unsaturation, generally exhibiting iodine numbers of between about 0.1 and 300, their Staudinger molecular weights varying from about 10,000 to about 500,000.

In practicing the present invention, halogenated rubbery polymers or copolymers, such as those named above or equivalent halogenated polymers or copolymers, are reacted at a temperature level of about −30° to +300° C., preferably about 100° to 200° C., with about 0.01 to 50, preferably 0.1 to 10 mole/mole of halogenated polymeric material, of the fused reaction product of an alkali metal amide and an alkali metal $C_1$ to $C_8$ carboxylate, the preferred times of reaction being from between about 0.01 to 100 hours, and especially about 0.5 to 30 hours. Typical fused reaction products of alkali metal amides with alkali metal $C_1$ to $C_8$ carboxylates include among others such materials as sodium alpha-sodio propionate, sodium alpha-sodio butyrate and especially sodium alpha-sodio acetate which is the reaction product of sodium amide fused with sodium acetate. The above-indicated fused reaction products of an alkali metal amide and an alkali metal $C_1$ to $C_8$ carboxylate may be characterized as being an alkali metal alpha-alkali metal $C_1$ to $C_8$ carboxylate.

In order to more fully illustrate but not to limit the present invention, the following experimental data are given: Two samples, each of 10 grams of sodium alpha-sodio acetate were reacted in each instance with 90 grams of a brominated isobutylene-isoprene butyl rubber copolymer (15 weight percent in xylene), wherein the original brominated butyl rubber had a Mooney viscosity (212° F. for 8 minutes) of 43.2, a mole percent unsaturation of 0.9, and contained 13.5 weight percent of combined bromine and a chlorinated isobutylene-isoprene butyl rubber copolymer (15 wt. percent in xylene) wherein the chlorinated butyl rubber had a Mooney viscosity (212° F. for 8 minutes) of 26, a mole percent unsaturation of 1.1 and contained 13 weight percent chlorine. In each case the reaction was carried out at 200° F. for 1½ hours, the resulting halogenated butyl rubber cements each being washed three times with water and then precipitated with acetone. The samples were then allowed to dry overnight.

The reaction products formed were not only of increased molecular weight but of better resistance to sulfuric acid as well as much more stable when exposed to ozone and ultraviolet light. Also, after reaction with the sodium alpha-sodio acetate, the Mooney viscosity of the brominated butyl rubber was raised from 43.2 to 79.0, the Mooney viscosity of the chlorinated butyl rubber increasing from 26.0 to 49.0. In each case no change in mole percent unsaturation or halogen content was noted.

Resort may be had to modifications and variations of the enclosed embodiments without departing from the spirit of the invention or the scope of the appended claims.

What is claimed is:

1. A composition comprising the reaction product formed by reacting at −30 to 300° C. for 0.01 to 100 hours a rubbery halogenated hydrocarbon polymer having a mole percent unsaturation of between about 0.1 and 15.0 selected from the group consisting of copolymers of a major proportion of a $C_4$ to $C_8$ isoolefin and a minor proportion of a $C_4$ to $C_{14}$ multiolefin, homopolymers of aliphatic $C_2$ to $C_6$ alpha monoolefins, and copolymers of two aliphatic $C_2$ to $C_6$ alpha monoolefins, and 0.01 to 50 moles per mole of halogenated polymer of an alkali metal alpha-alkali metal $C_1$ to $C_8$ aliphatic carboxylate.

2. A composition according to claim 1 in which the rubbery halogenated hydrocarbon polymer comprises a halogenated isoolefin-multiolefin copolymer.

3. A composition according to claim 1 in which the rubbery halogenated hydrocarbon polymer comprises a halogenated ethylene-propylene copolymer.

4. A composition according to claim 1 in which the rubbery halogenated hydrocarbon polymer comprises a halogenated aluminum alkyl catalyzed olefinic polymer.

5. A composition according to claim 1 containing about 1 mole of rubbery halogenated hydrocarbon polymer reacted together with about 0.01 to 50 moles of an alkali metal alpha-alkali metal $C_1$ to $C_8$ aliphatic carboxylate.

6. A process for increasing the molecular weight, chemical resistance, ozone resistance and ultraviolet resistance of rubbery halogenated hydrocarbon polymers having iodine numbers of about 0.1 to 300.0 selected from the group consisting of copolymers of a major proportion of a $C_4$ to $C_8$ isoolefin and a minor proportion of a $C_4$ to $C_{14}$ multiolefin, homopolymers of aliphatic $C_2$ to $C_6$ alpha monoolefins, and copolymers of two aliphatic $C_2$ to $C_6$ alpha monoolefins, which comprises reacting said rubbery halogenated hydrocarbon polymer at a temperature level of between about $-30°$ and $+300°$ C., for about 0.01 to 100 hours, with about 0.01 to 50.0 moles per mole of rubbery halogenated hydrocarbon polymer of an alkali metal alpha-alkali metal $C_1$ to $C_8$ aliphatic carboxylate.

7. A process according to claim 6 in which the rubbery halogenated hydrocarbon polymer comprises a rubbery halogenated isoolefin-multiolefin copolymer.

8. A process according to claim 6 in which the rubbery halogenated hydrocarbon polymer comprises a rubbery halogenated aluminum alkyl catalyzed olefinic polymer.

9. A process according to claim 6 in which the rubbery halogenated hydrocarbon polymer comprises chlorinated polyethylene.

10. A process according to claim 6 in which the rubbery halogenated hydrocarbon polymer comprises a halogenated ethylenepropylene copolymer.

11. A process according to claim 6 in which alkali metal alpha-alkali metal $C_1$ to $C_8$ aliphatic carboxylate is sodium alpha-sodio acetate.

12. A process according to claim 6 in which the rubbery halogenated hydrocarbon polymer is reacted in the presence of solvating quantities of an inert organic solvent.

13. A composition comprising the reaction product at a temperature of 30 to 300° C. for a reaction period of 0.01 to 100 hours of (1) a rubbery halogenated hydrocarbon polymer having a mole percent unsaturation of between about 0.1 and 15, said hydrocarbon polymer being selected from the class consisting of copolymers of a major portion of $C_4$ to $C_8$ isoolefins and a minor portion of $C_4$ to $C_{14}$ multiolefins, homopolymers of aliphatic $C_2$ to $C_6$ alpha monoolefins, and copolymers of two aliphatic $C_2$ to $C_6$ alpha monoolefins, and 0.01 to 50 moles per mole of halogenated polymer of (2) an alkali metal alpha-alkali metal $C_1$ to $C_8$ aliphatic carboxylate.

References Cited in the file of this patent

UNITED STATES PATENTS

| | | |
|---|---|---|
| 2,327,517 | Frolich et al. | Aug. 24, 1943 |
| 2,850,528 | Closson | Sept. 2, 1958 |

FOREIGN PATENTS

| | | |
|---|---|---|
| 799,193 | Great Britain | Aug. 6, 1958 |

OTHER REFERENCES

Whitby: "Synthetic Rubber," page 392, John Wiley and Sons, Inc., New York, 1954.